Patented Jan. 11, 1927.

1,614,369

UNITED STATES PATENT OFFICE.

OTTO KIPPE, OF OSNABRUCK, GERMANY.

PROCESS OF CONGLOMERATING FINE ORES, FLUE DUST, THE RESIDUE OF ROASTING PYRITES, SMALL COKE, AND THE LIKE.

No Drawing. Application filed June 17, 1925, Serial No. 37,851, and in Germany June 28, 1924.

My invention relates to improvements in the process of conglomerating fine ore, flue dust, the residue of roasting pyrites, small coke and the like, the object being to transform the said powderous or granular matter into the form of bricks suitable for the treatment in metallurgical furnaces. The object of the improvements is to provide a process which requires a minimum of the binding medium, in which the conglomeration is completed within a short period of time, and which results in strong bricks adapted to withstand the pressure exerted thereon for example in high furnaces. With this object in view my invention consists in using as a binding medium iron in a finely divided state, the said finely divided iron being admixed to the material to be conglomerated, together with substances, such as salts or acids, which will stimulate the oxidation of the iron. I have found that, when oxidizing the fine particles of iron, the increase of the volume of the said particles is so small that breaking or cracking of the brick is avoided. In the practice of the process I prefer to use gray iron as a binding medium, preferably in the form of shavings, the said shavings being ground for example in a ball mill, the size of the said disintegrated iron being such that the disintegrated matter passes through a sieve having meshes of an area of not more than ½ square millimeter. As media for stimulating the oxidation of the iron I prefer to add chlorid of magnesium, sulfate of iron and the like.

The rigidity of the bricks can be further increased to such a point that the bricks can be moulded even in roller presses, by adding to the fine ore, the flue dust or the like and the finely ground iron shavings a certain amount of cellulose waste lye. My opinion is that the finely ground iron shavings and the said cellulose waste lye act on each other in such a way that, by the action of the said lye on the metallic iron the oxidation generates heat, the said heat causing vaporization of the water of the lye, so that the high binding power of the lye comes into action. Where the lye is added the amount of iron powder can be reduced. Thus, whereas, when the lye is not added, the amount of the iron powder is about 4 per cent of the mass to be conglomerated, when the lye is added the amount of iron powder may be reduced to 2 or 3 per cent.

Example 1.—Gray iron, preferably in the form of shavings, is ground in a ball mill to a size of the particles of about ½ square millimeter. Thereafter I mix 94 kilogrammes of fine ore, flue dust or the like, in which the particles have the size of the particles of sand or peas, 4 kilogrammes of the said disintegrated gray iron, 2 kilogrammes of chlorid of magnesium lye or 2 kilogrammes of a concentrated solution of sulfate of iron. After intimate mixing the matter is pressed into solid bricks in a suitable press and stored about 2 or 3 days in the air. Within this period of time the finely ground gray iron is oxidized, thus binding the flue dust or the fine ore. The bricks thus obtained can directly be treated in a high furnace.

Example 2.—92 kilogrammes of flue dust or fine ore, 2 kilogrammes of chlorid of magnesium lye or 2 kilogrammes of a concentrated solution of sulfate of iron, and 3 kilogrammes of cellulose waste lye are intimately mixed with 3 kilogrammes of fine iron powder. The mixture is pressed into bricks and left in the open air 2 or 3 days, whereupon the bricks can be directly charged into the high furnace.

Example 3.—94 kilogrammes of small coke, 4 kilogrammes of ground gray iron and 2 kilogrammes of chlorid of magnesium lye are intimately mixed and pressed into bricks. The bricks are left in the air a few days, whereupon they can be used in the high furnace as fuel.

I claim:

1. The herein described process of conglomerating fine ore, small coke, or similar granular material for smelting, which consists in mixing the said granular material with powderous iron and a liquid adapted to accelerate oxidation of said iron, pressing the mixture into blocks, and allowing the iron to oxidize.

2. The herein described process of conglomerating fine ores or the like for smelting, which consists in mixing the said material with ground iron and a solution of a medium adapted to accelerate oxidation of the iron, pressing the mixture into blocks, and allowing the iron to oxidize.

3. The herein described process of conglomerating fine ore or the like for smelting, which consists in mixing the said material with ground iron, a medium adapted to accelerate the oxidation of the iron, and a cellulose waste lye, pressing the mixture into blocks, and allowing the iron to oxidize.

In testimony whereof I have hereunto set my hand.

Dr. OTTO KIPPE.